United States Patent [19]
Isenga

[11] Patent Number: 4,954,932
[45] Date of Patent: Sep. 4, 1990

[54] TRANSOM LIGHT

[75] Inventor: Steve Isenga, Zeeland, Mich.

[73] Assignee: ITC Incorporated, Zeeland, Mich.

[21] Appl. No.: 441,035

[22] Filed: Nov. 22, 1989

[51] Int. Cl.$^5$ .............................................. B60Q 1/00
[52] U.S. Cl. ..................................... 362/61; 362/255; 114/343
[58] Field of Search ................... 114/177, 343; 362/61, 362/80, 267; 313/318, 110, 116

[56] References Cited

U.S. PATENT DOCUMENTS

| | | | |
|---|---|---|---|
| 221,105 | 7/1871 | Stewart | D38/42 |
| 4,054,792 | 10/1977 | Brudy | 362/267 |
| 4,245,281 | 1/1981 | Ziaylek, Jr. | 362/267 |
| 4,360,859 | 11/1982 | Ziaylek, Jr. | 362/267 |
| 4,445,163 | 4/1984 | Ziaylek, Jr. et al. | 362/267 |
| 4,539,629 | 5/1985 | Poppenheimer | 362/267 |
| 4,543,623 | 9/1985 | Ehret | 362/267 |
| 4,617,615 | 10/1986 | Eychaner | 362/267 |
| 4,622,623 | 11/1986 | Zei | 362/267 |

FOREIGN PATENT DOCUMENTS

| | | | |
|---|---|---|---|
| 651340 | 7/1959 | Canada | 362/61 |
| 0685548 | 9/1979 | U.S.S.R. | 114/177 |
| 1134462 | 1/1985 | U.S.S.R. | 114/177 |
| 930344 | 7/1963 | United Kingdom | 362/61 |
| 1390255 | 4/1975 | United Kingdom | 362/61 |

OTHER PUBLICATIONS

Page 36 of Attwood Product Catalog, 1989–1990.
Page 62 of GEM Products, Incorporated Price List, Jul. 1986.
Page 6 of Perko, Inc. Catalog No. 255, 1988–1989.
Page 49 of Industrial Liaison, Inc. Catalog.

Primary Examiner—Ira S. Lazarus
Assistant Examiner—Sue Hagarman
Attorney, Agent, or Firm—Flynn, Thiel, Boutell & Tanis

[57] ABSTRACT

A transom light includes a lamp and a shroud attached to the lamp. The shroud includes a hollow part and a flange, both arranged substantially concentrically relative to a central axis of the lamp. The hollow part is adapted to receive the lamp therein, and the shroud flange is axially received within a transparent lens such that it is surrounded by an axially projecting lip upstanding from the lens. A gasket is disposed axially against the shroud flange opposite the lens so as to axially overlap both the shroud flange and the lip of the lens. An arrangement is provided for securing the lens, shroud flange and gasket to a watercraft hull, with the lamp and the hollow part of the shroud received in an opening in the hull. Structure is provided on the lens to retain thereon a decorative bezel arrangement.

20 Claims, 3 Drawing Sheets

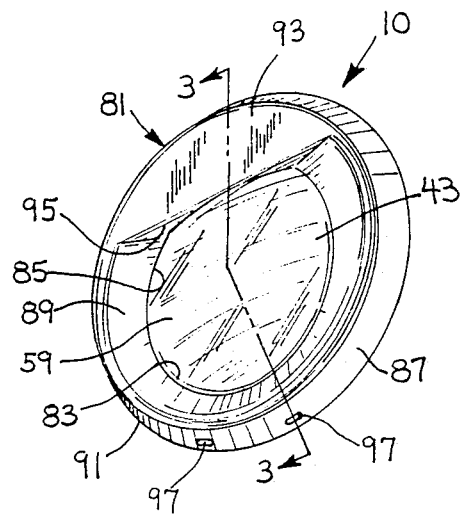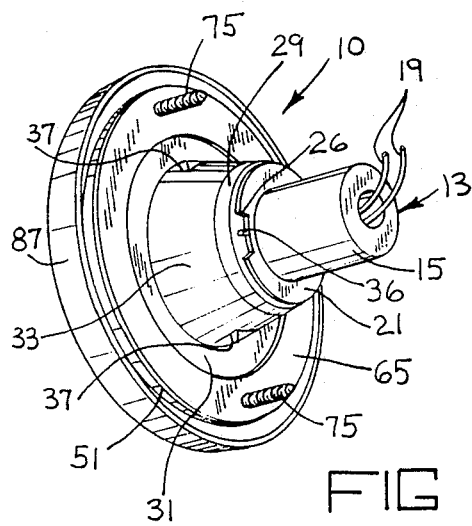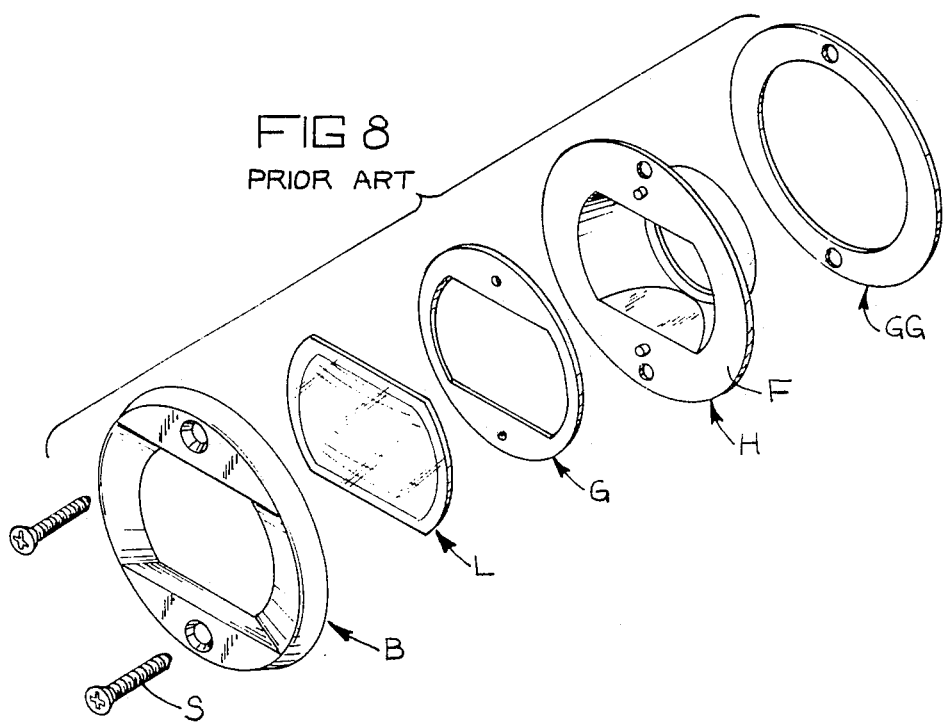

TRANSOM LIGHT

FIELD OF THE INVENTION

The present invention relates to a transom light for flush mounting on the hull of a watercraft.

BACKGROUND OF THE INVENTION

A conventional flush mount transom light for watercraft (FIG. 8) includes an open ended lamp housing H which has a light bulb (not shown) mounted therein and is adapted to extend through an opening in the hull (not shown) of a watercraft. The lamp housing outer end, and hence the hull opening is covered by a substantially transparent lens L which is in turn covered along its outer perimeter by a substantially annular bezel B. Coaxially aligned screw holes are formed in the bezel and the lamp housing, and screws S are inserted through the aligned holes to fasten the lamp assembly to the watercraft hull. Thus, the bezel is used to retain the lens over the hull opening and lamp housing so that the light shines therethrough. The bezel is typically a decorative item, made from, for example, chrome plated metal or stainless steel. However, the screw heads at the outer ends of the fastening screws are visible within the bezel holes after the installation is complete. The visibility of these screws detracts from the decorative appearance of the bezel and thus the overall appearance of the transom light. Moreover, water leakage through the screw holes in the bezel is a potential problem with such conventional transom lights.

Another problem with such conventional transom lights is that the lens typically seats against a perimeter flange F on the lamp housing which perimeter flange bears against a portion of the watercraft hull immediately surrounding the opening therein. The bezel retains the lens against the outer surface of the flange, and the inner surface of the flange directly abuts the watercraft hull. Thus, water can penetrate into the hull opening by leaking between the lens and the housing flange and by leaking between the housing flange and the hull, in addition to the previously discussed leakage through the mounting holes. To avoid such moisture penetration, separate gaskets G and GG are conventionally provided respectively between the lens and the housing flange and the housing flange and the hull. The necessity of providing at least two gaskets disadvantageously increases production costs, complicates installation, and adds to the overall thickness of what is desirably a flush mount apparatus.

Accordingly, it is an object of the present invention to provide a flush mount transom light for a watercraft which has no externally visible or accessible fasteners when completely installed.

It is a further object of the present invention to provide a transom light, as aforesaid, in which the lamp housing can be sealed against water penetration between itself and both the lens and watercraft hull by means of a single gasket.

It is a further object of the present invention to provide a transom light, as aforesaid, which provides ventilation for a light bulb used therein.

It is a further object of the invention to provide a transom light, as aforesaid, which is easily transported with all of its parts completely assembled.

It is a further object of the invention to provide a transom light, as aforesaid, which is aesthetically pleasing and which meets existing maritime standards regarding the required angle of visibility of the light.

It is a further object of the invention to provide a transom light, as aforesaid, which is inexpensive to manufacture, and easily assembled and installed.

SUMMARY OF THE INVENTION

The objects and purposes of the invention, including those mentioned above, are met by providing a transom light for flush mounting on a watercraft hull which has no externally visible or accessible fasteners when completely installed, and the housing of which can be sealed against water penetration between itself and both the lens and watercraft hull by means of a single gasket.

BRIEF DESCRIPTION OF THE DRAWINGS

An exemplary embodiment of the invention will be described in detail hereinafter in connection with the drawings, in which:

FIG. 1 is a pictorial view of the externally visible portion of the transom light of the present invention as viewed from the lower right front;

FIG. 2 is a pictorial view showing the transom light of FIG. 1 as viewed from the lower right rear;

FIG. 8 is an exploded pictorial view of a prior art transom light.

DETAILED DESCRIPTION

In the following description the terms "front" and "rear" refer to the left and right directions, respectively, in FIG. 3.

Figure 3:
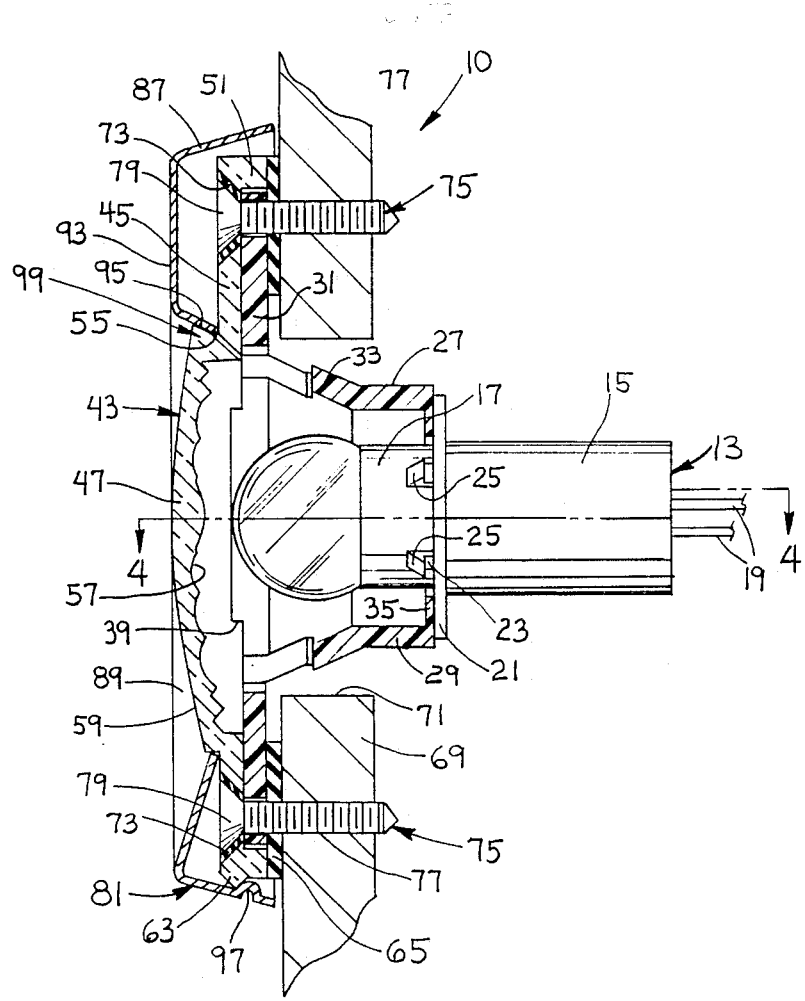
FIG. 3 is an enlarged cross-sectional view taken substantially on the line 3—3 of FIG. 1.
Figure 4:
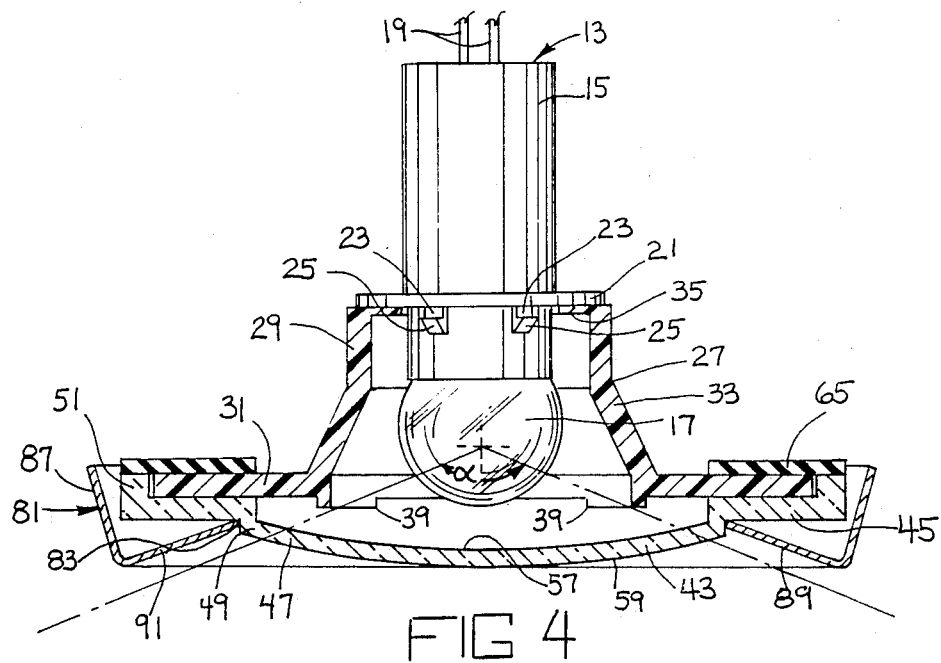
FIG. 4 is a cross-sectional view taken substantially on the line 4—4 of FIG. 3.

As shown in FIGS. 2-4, a transom light assembly 10 of the present invention includes a lamp unit (hereafter merely the lamp) 13 having a body 15 in which a conventional light bulb 17 is receivable. A pair of conductors 19 are electrically connected to a conventional socket (not shown) within front end of the body 15 for removably receiving the light bulb 17. The conductors 19 are insulated where they emerge from the rear end of the lamp 13 and are conventionally connectable to a suitable source of electric power to light the light bulb 17.

The body 15 has a generally right circular cylindrical configuration, and includes a radially extending annular flange 21 at the front end thereof. The light bulb 17 inserted in the front end of the body 15 is surrounded by the flange 21. A plurality of resilient arms 23 extend forward from the flanged end of the lamp body 15 so as to be spaced circumferentially around the base of the light bulb 17. Tapered tabs 25 project radially outwardly from the arms 23.

Referring to FIGS. 3 and 4, a lamp shroud 27 includes a right circular cylindrical portion 29 coaxial with the lamp 13. The shroud 27 includes a radially outwardly extending annular flange 31 which is forwardly spaced from the cylindrical portion 29 and connected thereto by an intervening, forwardly divergent conical portion 33. The cylindrical portion 29, conical portion 33 and annular flange 31 are coaxial. The cylindrical portion 29 and the conical portion 33 are hollow, and loosely receive the light bulb 17.

The cylindrical portion 29 includes a radially inwardly extending annular lip 35 at its rear end. The resilient arms 23 of the lamp 13 are inserted forwardly into the cylindrical portion 29 and press radially outwardly against a radially inner edge of the annular lip 35. When the annular flange 21 of the lamp 13 bears forwardly against the annular lip 35 of the shroud 27, the tabs 25 snap radially outward over the front of the lip 35 and the lip 35 is thus positively captured between the tabs 25 and the annular lamp flange 21. Thus, a snap fit coupling between the lamp 13 and the shroud 27 is effected.

The flange 21 has circumferentially extending notches 26 through which extend axially projecting stops 36 located on the annular lip 35 (FIG. 2). The stops 36 and notches 26 coact to limit relative rotation between the lamp body 15 and the shroud 27 to facilitate replacing the bulb 17.

Figure 7:
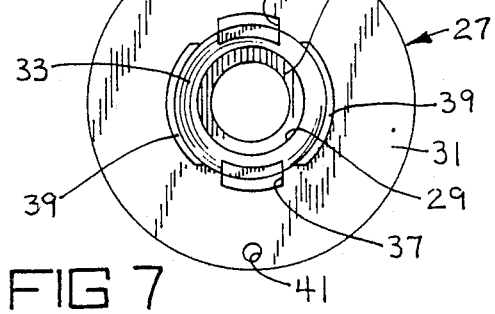
FIG. 7 is a front elevational view of the lamp shroud of the FIG. 1 transom light.

As best seen in FIGS. 2 and 7, the conical portion 33 includes a pair of diametrically opposed rectangular openings 37 therein which adjoin the flange 31 at its inner edge. The transom light 10 is preferably mounted so that the rectangular openings 37 are respectively located vertically above and below the light bulb 17. Thus, as the air within the shroud 27 is heated, it rises and can escape through the upper opening 37 while being simultaneously replaced with cooler air drawn up into the conical portion 33 of the shroud 27 through the lower opening 37. Accordingly, the rectangular openings 37 permit an advantageous convection cooling air flow which keeps the air temperature in the shroud 27 lower than in conventional transom lights which have closed shrouds (see FIG. 8). Such lower temperatures obviously result in a longer operating life for the light bulb 17. Additionally, the convection air flow helps reduce the incidence of undesirable moisture condensation within the transom light, and resultant "fogging" of the hereafter described lens.

Two diametrically opposed, circumferentially extending walls 39 are located along the inner edge of the shroud flange 31 and project forwardly for a small distance therefrom. The walls 39 are horizontally opposed and each located circumferentially midway between the rectangular openings 37. The shroud flange 31 also includes a pair of diametrically opposed circular mounting holes 41 adjacent the radially outer edge thereof and radially aligned with the rectangular openings 37.

Figure 6:
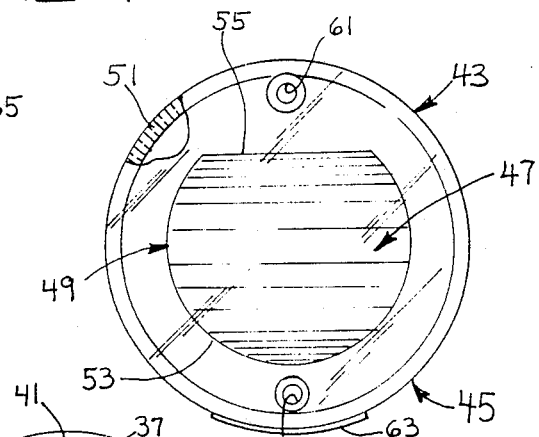
FIG. 6 is a front elevational view of the lens of the FIG. 1 transom light.

Referring to FIGS. 3, 4 and 6, a disk-shaped and substantially transparent lens 43 includes a flat annular outer portion 45 which surrounds a forwardly dome-shaped central portion 47. The dome-shaped central portion 47 is slightly forwardly offset from the outer portion 45 and is joined thereto by a forwardly raised step 49 which defines the radially inner edge of the annular outer portion 45. An annular lip 51 extends circumferentially along the outer peripheral edge of the outer portion 45, and projects rearwardly for a distance approximately equal to the axial thickness of the shroud flange 31 to define a shallow rear facing recess. The shroud flange 31 is coaxially received in the shallow rear facing recess in the lens 43 such that the outer peripheral edge of the shroud flange 31 is closely surrounded by the lip 51, and the flange 31 bears forwardly against the outer portion 45 of the lens with the rear faces of the flange 31 and lens lip 51 substantially flush.

As seen from the front in FIG. 6, the axially raised step 49 includes a semi-circular part 53 and a horizontal, upper, straight (chordal) part 55, which forms a chord relative to the semi-circular part. As seen in FIG. 3, the dome-shaped portion 47 is undercut rearward and radially inward throughout the straight part 55 of the step 49 so as to slightly radially overlap the outer portion 45 of the lens 43 adjacent the straight part 55 (FIG. 3).

The dome-shaped portion 47 has a substantially, concave rear surface 57 which faces the shroud 27 and has horizontal ridges parallel to the straight part 55 of the step 49. The dome-shaped portion 47 also has a smooth convex front surface 59. The apex of the dome-shaped portion 47 is coaxial with the lamp 13.

The outer portion 45 of the lens 43 includes a pair of diametrically opposed circular countersunk holes 61 arranged so that a line drawn therebetween bisects the straight part 55 of the step 49. The countersunk holes 61 are coaxially aligned with the holes 41 in the shroud flange 31.

The lens 43 further includes a circumferentially extending tab 63 which projects radially outwardly from the outer peripheral surface of the rear projecting lip 51. The tab 63 is circumferentially symmetric with respect to the lower countersunk hole 61 and is diametrically opposite the straight part 55 of the step 49. In this embodiment, the tab 63 extends circumferentially through approximately 45 degrees as measured from the center of the lens 43.

Figure 5:
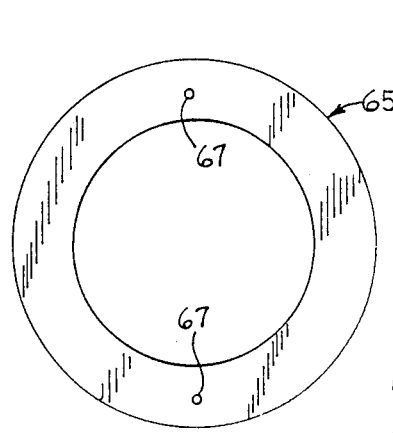
FIG. 5 is a front elevational view of the gasket of the FIG. 1 transom light.

With the shroud flange 31 forwardly received in the lens 43, an annular resilient (e.g. rubber) gasket 65 (FIG. 5) having a pair of diametrically opposed circular mounting holes 67 formed therein is axially applied against rear faces of both the shroud flange 31 and the rearward projecting lip 51 as shown in FIGS. 3 and 4. The gasket 65 has an outer diameter at least as large as the outer diameter of the lens 43, and an inner diameter which is substantially less than the distance between the countersunk holes 61, to ensure radial overlapping of both the lens lip 51 and the shroud flange 31. The gasket 65 is oriented so that the holes 67 are coaxially aligned with the aligned holes 41 and 61 in the shroud 27 and the lens 43.

As shown in FIG. 3, the lamp 13 is adapted to be received in an opening 71 in the hull 69 of a watercraft. The gasket 65 is sandwiched axially between the hull 69 and the shroud flange 31 and lens lip 51. Thus, the flange 31 is sealed by the single gasket 65 against penetration of water between itself and both the lens 43 and hull 69.

Screws 75 having tapered heads 79 (e.g. flat head screws) are driven through the aligned holes 61, 41 and 67 and into the hull 69 to removably secure the lens 43, shroud 27 and gasket 65 to the hull 69. Conical resilient washers 73 are received in the countersunk holes 61 of the lens 43 between the tapered screw heads 79 and the lens. These washers prevent leakage of moisture between the screw heads 79 and lens 43 into the space between the lens 43 and the shroud 27.

The holes 67 in the gasket 65 have a diameter approximately equal to the root diameter of the screws 75 so that the threads 77 prevent the screws 75 from passing freely axially through the holes 67. Thus, as best shown in FIG. 2, with the lens 43, shroud 27 and gasket 65 carried on the screws 75 adjacent their heads 79, the gasket 65 axially grips the screw threads 77, whereby the lens 43 and the shroud 27 are held relatively firmly axially between the gasket 65 and the screw heads 79. Thus, the lamp 13, shroud 27, lens 43, gasket 65, washers 73 and screws 75, when so assembled, are easily transported and installed as a unit in the hull 69.

Referring to FIGS. 1, 3 and 4, an annular bezel 81 includes an inner peripheral edge 83 which defines a central opening 85 therein shaped to snugly receive therein the axially raised step 49 and dome portion 47 of the lens 43. The bezel 81 includes a sloped peripheral wall 87, and a rim 89 extending radially inwardly from the outer peripheral wall 87 and terminating at the inner peripheral edge 83. The rim 89 includes a semi-circular portion 91 which corresponds to the semi-circular part 53 of the lens raised step 49, and which slopes rearward and radially inward to a semi-circular portion of the inner peripheral edge 83.

The rim 89 also includes a catch portion 93 having a chordally extending catch 95 at its inner peripheral edge 83. The remainder of the catch portion 93 is generally planar and extends radially between the catch 95 and the outer peripheral wall 87. The catch 95 slopes rearward and radially inward from the radially extending remainder of the catch portion 93. As shown particularly in FIG. 3, the undercut straight part 55 of the raised step 49 of the lens defines a retainer 99 for the catch 95 of the bezel.

The outer peripheral wall 87 includes a pair of closely circumferentially spaced radial inward projections 97 which are diametrally remote from the catch 95 and face toward same.

With the lens oriented as in FIG. 3, the bezel 81 is snap fitted onto the lens 43 by sliding the bezel catch 95 downward and rearward into engagement with the undercut retainer 99 on the front of the lens 43, and then by pivoting the bezel semi-circular portion 91 rearward toward the lens 43 forcibly such that the bezel projections 97 are snapped rearwardly under the lens tab 63 and are trapped behind the lens tab. In this installed position, the bezel outer peripheral wall 87 loosely radially surrounds the lens lip 51, the bezel rim 89 frontally covers the outer portion 45 of the lens 43 and the heads 79 of the screws 75, the lens dome-shaped portion 47 protrudes forward through the central opening 85, and the step 49 is snugly surrounded by the bezel inner peripheral edge 83 with the bezel catch 95 snugly retained against the undercut retainer 99 of the lens and the bezel projections 97 resiliently pressing radially toward the lip 51 at a location axially between the tab 63 and the gasket 65. Thus, the lens 43 is firmly gripped between the bezel catch 95 and projections 97.

Thus, the bezel 81 can be easily removably snap fitted over the lens 43 after the lens, shroud 27, body 15, washers 73, and gasket 65 have been assembled on the screws 75, for convenient transportation and storage of the entire transom light 10 as a unit.

When the transom light 10 is to be mounted on the boat hull 69, the bezel 81 is simply resiliently snapped off the lens 43 by reversing the above installation steps. Then the lamp 13 and shroud 27 are inserted rearward into the hull opening 71 toward their FIG. 3 position, the screws 75 are driven rearward into the hull 69 to seal the lens outer peripheral lip 51 and shroud flange 31 onto gasket 65 and seal gasket 65 onto the outer surface of the boat hull 69. Then, the bezel 81 is again snap fitted over the lens 43 to complete installation of the transom light 10.

As shown in FIG. 4, the semi-circular portion 91 of the rim 89 inclines from the wall 87 toward the lens step 49 so as to provide the angle of visibility α required by maritime safety standards.

To replace a worn out light bulb 17, the bezel 81 is snapped off the lens, the screws 75 are backed out, and the lens 43 is removed to expose the bulb 17. After changing the bulb, these steps are reversed to reinstall the transom light 10.

In the disclosed embodiment, the bezel 81 is stainless steel, the lens 43 is molded from polycarbonate, the shroud 27 is molded from polycarbonate, and the body 15 of the lamp 13 is molded from polycarbonate.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A flush mount lamp assembly for mounting on the hull of a watercraft, comprising:
   means for defining a support for a light source, a lens carried on said support means, fastening members extending through said lens and adapted to affix into the hull, bezel means for preventing visual observation of and physical access to said fastening members, and means coacting between said lens and said bezel means for releasably fixing said bezel means on said lens.

2. A flush mount lamp assembly for mounting in an opening in the hull of a watercraft, comprising:
   a lens having an outer portion surrounding a central portion, said central lens portion being slightly axially offset from said outer lens portion, said central portion and said outer portion being axially joined by a raised step located at an inner edge of said outer portion, said lens including at least one tab projecting outwardly from an outer peripheral edge thereof;
   means defining a lamp, said lens being carried on said lamp;
   means for securing said lens and said lamp to the watercraft hull; and
   a bezel including a peripheral wall and a rim extending radially inwardly from said peripheral wall and terminating at an inner edge to define a central opening, said rim including a catch portion having a catch at said inner edge, said catch being engaged against said lens step axially between said outer lens portion and said central lens portion, said peripheral wall having at least one projection extending inwardly therefrom across said central opening from said catch, said at least one projection being engaged against and axially retained by said at least one tab in a position axially behind said at least one tab, said at least one projection pressing inwardly against said outer peripheral edge of said lens and toward said central portion, and said catch pressing against said lens step substantially oppositely of said at least one projection such that a substantial part of said lens is held firmly gripped therebetween.

3. The lamp assembly according to claim 2, wherein said securing means includes means for defining holes in said lens outer portion, and elongate fasteners extending through said lens holes and adapted to affix into the hull of the watercraft, said fasteners being hidden by said bezel.

4. The lamp assembly according to claim 3, wherein said central opening of said bezel is shaped in substantial conformity with said lens step, wherein said bezel is positioned such that said peripheral wall surrounds said lens and said rim axially covers said outer portion of said lens including said holes in said lens and said fasteners, and wherein said central portion is axially received in said central opening of said bezel with said step snugly surrounded by said inner peripheral edge of said bezel.

5. A flush mount lamp assembly for mounting in an opening in the hull of a watercraft, comprising:
   means including a shroud for receiving a light bulb, the shroud including a substantially radially extending flange;
   a lens having an axially projecting, coaxial lip, said lip projecting axially to define a recess substantially corresponding to the thickness of said shroud flange, said shroud flange being axially received in said lens recess such that the outer peripheral edge of said shroud flange is closely surrounded by said lip;
   a gasket disposed axially against said shroud flange opposite said lens, said shroud flange being sandwiched axially between said lens and said gasket, said gasket radially overlapping and axially covering both said shroud flange and an axially facing free end of said lens lip, said gasket being adapted for sealing engagement between said lens lip and said shroud flange on one axial side, and a portion of the watercraft hull proximately surrounding the opening therein on the other axial side; and
   means for securing said lens, said shroud and said gasket to the watercraft hull with said lamp and said shroud received in the hull opening.

6. The lamp assembly according to claim 5, wherein said means for receiving includes a lamp fixed to the shroud, said lamp having a body, said lamp body including means defining an opening at one end thereof adapted to receive a light bulb therein, and means for connecting the light bulb to a source of electric power, said shroud being adapted to receive a light bulb extendable from said lamp body, said lamp body having a flange extending outwardly from and surrounding said lamp receiving opening, and plural resilient arms extending from said lamp body flange, said arms being spaced peripherally around said lamp receiving opening and having outwardly protruding tabs at respective free ends thereof, and wherein said shroud has an inwardly extending lip at an end thereof opposite said shroud flange and axially abutting said lamp body flange, said resilient arms extending into said shroud and urging outwardly against an inner edge of said shroud lip, said tabs axially abutting an axially facing surface of said shroud lip opposite said lamp body such that said shroud lip is axially captured between said tabs and said lamp body flange.

7. The lamp assembly according to claim 6, wherein one of said lamp body flange and said shroud lip includes means for defining at least one circumferentially extending opening therein, and wherein the other of said lamp body flange and said shroud lip includes at least one axially extending stop which projects into said opening, said opening and said stop coacting to limit relative rotation between said lamp body and said shroud to facilitate replacement of the light bulb.

8. The lamp assembly according to claim 5, wherein said shroud includes means defining a pair of diametrically opposed openings therein adjacent an inner edge of said shroud flange for cooling a light bulb to be received therein.

9. The lamp assembly according to claim 8, wherein said shroud includes a right circular cylindrical portion axially spaced from said shroud flange, and a conical portion arranged axially between said cylindrical portion and said flange, said conical portion being coaxial with said flange and said cylindrical portion, wherein said shroud flange and lens outer portion and lip, and said gasket and peripheral wall of said bezel are annular, said shroud cylindrical portion having an outer diameter which is less than an inner diameter of said shroud annular flange, said shroud conical portion having a diameter which increases axially as it extends from said cylindrical portion to said shroud flange, said diametrically opposed openings being in said conical portion, and said shroud including a pair of diametrically opposed, circumferentially extending walls respectively located along said inner edge of said shroud flange between said openings in said conical portion, said walls projecting from said shroud flange axially away from said conical portion.

10. The lamp assembly according to claim 5, wherein said securing means includes means for defining coaxially aligned holes respectively in said lens, said shroud flange and said annular gasket, and elongate fasteners extending through said aligned holes and adapted to affix to the hull of the watercraft, said fasteners being a tight fit in said holes in said gasket, whereby relative axial movement between said fasteners and said gasket is resisted.

11. The lamp assembly according to claim 10, wherein said holes in said lens outer portion are countersunk, wherein said fasteners are screws having countersunk heads which are received in said countersunk lens holes, and wherein said gasket holes have a diameter approximately equal to a root diameter of said screws such that the threads of said screws axially grip said gasket, whereby said lens and said shroud are axially captured between said screw heads and said gasket.

12. The lamp assembly according to claim 11, wherein said securing means further includes a pair of generally conical resilient washers received in said countersunk holes in said lens between said lens and said screw heads.

13. A flush mount lamp assembly for mounting in an opening in the hull of a watercraft, comprising:
   a lamp including means defining a body having an opening at one end thereof adapted to receive a light bulb therein, and means for connecting the light bulb to a source of electric power;
   a shroud attached to said lamp body at said one end thereof, said shroud including a hollow part and a flange, both substantially coaxial with said lamp body, said flange being axially spaced from said lamp body and joined thereto by said hollow part, said hollow part being attached to said lamp body, said hollow part being adapted to receive a lighting element end of the light bulb which extends from said lamp body;
   a lens having an outer portion surrounding a central portion, said lens including an axially projecting lip on said outer portion, said lip surrounding said central portion and being spaced therefrom, said lip projecting axially substantially the thickness of said shroud flange and forming an axially facing recess, said shroud flange being axially received in said lens recess such that the outer peripheral edge of said shroud flange is closely surrounded by said lip of said lens, said lens central portion being slightly axially offset from said outer lens portion, said central portion and said outer portion being axially joined by a raised step located at an inner edge of said outer portion, said step and lip projecting in axially opposite directions, said lens including at least one tab projecting radially outwardly from said lip at a location across said central portion from said step;

a gasket disposed axially against said shroud flange and surrounding said hollow portion, said shroud flange being sandwiched axially between said outer portion of said lens and said gasket, said gasket radially overlapping both said shroud flange and an axially facing free end of said lens lip, said gasket being adapted for sealing engagement between said lens lip and said shroud flange on one axial side, and a portion of the watercraft hull proximately surrounding the opening therein on the other axial side;

means for securing said lens, said shroud and said gasket to the watercraft hull with said lamp and said shroud received in the hull opening; and a bezel including a peripheral wall and a rim extending radially inwardly from said peripheral wall and terminating at an inner edge to define a central opening, said rim including a catch portion having a catch at said inner edge, said catch being engaged against said lens step axially between said outer lens portion and said central lens portion, said bezel peripheral wall having at least one projection extending inwardly therefrom at a location across said central opening from said catch, said at least one projection being engaged against and axially retained by said at least one tab, said at least one projection pressing inwardly against said lip of said lens and toward said central portion, and said catch pressing against said lens step substantially oppositely of said at least one projection such that a substantial part of said lens is held firmly gripped therebetween.

14. The lamp assembly according to claim 13, wherein said central portion extends slightly radially beyond said step so as to slightly radially overlap said outer portion of said lens adjacent said step.

15. The lamp assembly according to claim 14, wherein said central opening of said bezel is shaped in substantial conformity with said lens step, wherein said lens step and said radially overlapping part of said central portion together define a retainer for said catch, said bezel peripheral wall surrounding said lens lip, said bezel rim axially covering said outer portion of said lens, and said central portion being axially received in said central opening with said step snugly surrounded by said inner peripheral edge of said bezel.

16. The lamp assembly according to claim 15, wherein said securing means includes means for defining coaxially aligned holes respectively in said lens outer portion, said shroud flange and said annular gasket, and elongate fasteners extending through said aligned holes and adapted to affix to the hull of the watercraft, said fasteners being a tight fit in said holes in said gasket, whereby relative axial movement between said fasteners and said gasket is resisted.

17. The lamp assembly according to claim 16, wherein said holes in said lens outer portion are countersunk, wherein said fasteners are screws having countersunk heads which are received in said countersunk lens holes, and wherein said gasket holes have a diameter approximately equal to a root diameter of said screws such that the threads of said screws axially grip said gasket, whereby said lens and said shroud are axially captured between said screw heads and said gasket.

18. The lamp assembly according to claim 17, wherein said securing means further includes a pair of generally conical resilient washers received in said countersunk holes in said outer portion of said lens between said lens and said screw heads.

19. The lamp assembly according to claim 15, wherein said lens step includes a semi-circular part and a straight part, said retainer including said straight part.

20. The lamp assembly according to claim 19, wherein said at least one tab extends circumferentially for approximately 45 along said lip, and wherein said peripheral wall of said bezel flange includes a pair of circumferentially spaced said projections.

* * * * *

UNITED STATES PATENT AND TRADEMARK OFFICE
CERTIFICATE OF CORRECTION

PATENT NO. : 4,954,932

DATED : September 4, 1990

INVENTOR(S) : Steve Isenga

It is certified that error appears in the above-identified patent and that said Letters Patent is hereby corrected as shown below:

Col. 8, line 14; delete "outer portion".

Col. 8, line 38; delete "outer portion".

Signed and Sealed this

Ninth Day of June, 1992

*Attest:*

DOUGLAS B. COMER

*Attesting Officer*     *Acting Commissioner of Patents and Trademarks*